United States Patent [19]

Sakai et al.

[11] Patent Number: 5,423,239
[45] Date of Patent: Jun. 13, 1995

[54] METHOD FOR SLITTING A MAGNETIC TAPE

[75] Inventors: Naoki Sakai; Astushi Takano, both of Kanagawa, Japan

[73] Assignee: Fuji Photo Film Co., Ltd., Kanagawa, Japan

[21] Appl. No.: 27,586

[22] Filed: Mar. 2, 1993

Related U.S. Application Data

[63] Continuation of Ser. No. 683,627, Apr. 11, 1991, abandoned.

[30] Foreign Application Priority Data

Apr. 18, 1990 [JP] Japan .................. 2-100275

[51] Int. Cl.$^6$ .................. G11B 5/84; B26D 1/24
[52] U.S. Cl. .................. 83/56; 83/345; 83/500; 83/675; 83/676
[58] Field of Search .................. 83/56, 13, 51, 345, 83/495, 496, 497, 500, 503, 504, 505, 507, 676, 677, 674, 675; 30/347, 357; 225/3; 241/236; 493/340, 369, 370, 372

[56] References Cited

U.S. PATENT DOCUMENTS

| | | | |
|---|---|---|---|
| 527,178 | 10/1894 | Lennox | 83/503 X |
| 1,843,064 | 1/1932 | Chesney | 83/678 X |
| 1,949,066 | 2/1934 | Waner | 83/495 |
| 2,439,794 | 4/1948 | Bugatti | 83/497 X |
| 2,476,326 | 7/1949 | Sherman | 83/302 X |
| 3,312,135 | 4/1967 | Mraz | 83/500 X |
| 3,459,086 | 8/1969 | Reeder | 83/675 X |
| 3,630,460 | 12/1971 | Goldhammer | 241/236 |
| 3,960,335 | 6/1976 | Haberle | 241/236 |
| 4,459,888 | 7/1984 | Frye | 83/51 X |
| 4,638,701 | 1/1987 | Oberlander | 83/496 X |
| 4,680,851 | 7/1987 | Legg | 83/13 X |
| 4,709,480 | 12/1987 | Takigawa et al. | 30/357 X |
| 4,754,933 | 7/1988 | Leuthold et al. | 241/236 X |
| 4,885,964 | 12/1989 | Nielsen et al. | 83/504 X |
| 4,972,750 | 11/1990 | Paavola | 83/500 |
| 5,048,767 | 9/1991 | Mori | 241/236 |

FOREIGN PATENT DOCUMENTS 62-86530 4/1987 Japan .
1-246094 10/1989 Japan .

OTHER PUBLICATIONS

Maeda, T. and Murakawa, M. "The Development of Burr-Free Slitting." Journal of the Faculty of Engineering, Univ. of Tokyo, vol. XXXIV, No. 2 (Sep., 1977), pp. 377–393.

Primary Examiner—Richard K. Seidel
Assistant Examiner—Clark F. Dexter
Attorney, Agent, or Firm—Sughrue, Mion, Zinn, Macpeak & Seas

[57] ABSTRACT

A method for slitting a continuously running magnetic tape having a magnetic layer formed on the surface of a non-magnetic substance without producing burring. The tape is slit from the front and rear side surfaces of the magnetic tape by a pair of upper and lower rotary blades having rotational axes substantially parallel to the tape surface and extending in the tape width direction and radially overlapping each other. A gap is formed between blade edges of the rotary blades in the tape width direction having a width in a range of 3% to 20% of the thickness of the magnetic tape.

3 Claims, 3 Drawing Sheets

METHOD FOR SLITTING A MAGNETIC TAPE

This is a Continuation of application Ser. No. 07/638,627 filed Apr. 11, 1991, now abandoned.

BACKGROUND OF THE INVENTION

The present invention relates to a method for slitting a magnetic tape, and particularly relates to a method for slitting a magnetic tape in which a wide magnetic tape is cut into narrow magnetic tapes while the wide magnetic tape is continuously run.

Recently, magnetic tapes or the like widely used in various fields have been produced by a method in which a magnetic tape having a width wider than that of the final product is subjected to various treatments and then cut into separate tapes of the final product width.

Such slitting of a magnetic tape is performed continuously while the tape is pulled from a wider magnetic tape master roll and continuously run. A slitter used in this slitting method employs a plurality of rotating circular blades (hereinafter referred to as "rotary blades") having rotational axes arranged substantially parallel to the tape surface of a magnetic tape and extending in the tape width direction, the rotary blades being arranged side by side in upper and lower pairs so that each pair of upper and lower opposing rotary blades radially overlap each other from the front and rear side surfaces of the magnetic tape.

A conventional slitting method will be described with reference to FIGS. 9 to 11. FIG. 9 is a schematic side view, FIG. 10 is a sectional view taken along a line C—C in FIG. 9, and FIG. 11 is a sectional view taken along a line D—D in FIG. 9.

As shown in FIG. 9, upper and lower blades 20 and 30, which are rotary blades of a slitter 40, rotate in the forward direction of the running direction of a magnetic tape T and about the rotating axes $O_1$ and $O_2$ substantially parallel to the tape surface and along the tape width direction, and are arranged opposed to each other from the top and bottom surfaces of the tape so as to overlap each other in their radial directions.

The upper and lower blades 20 and 30 overlap each other to such an extent as to press against each other, whereby slitting is performed by making the above-mentioned magnetic tape pass therebetween.

In such a slitting process, it is known that, as shown in FIG. 10, cracks tend to occur in a magnetic layer and a support 6 in the vicinity of the magnetic tape T, which cracks can come together to cause shearing or separation in the magnetic tape T. (See, for example, Tadaaki Sugita et al., "STUDY ON MICRO-SHEARING PROCESSING OF A THIN FILM," p. 371, Extended Abstracts, The Autumn Meeting, 1984, The Japan Society of Precision Engineering).

In such a conventional slitting method, as shown in FIGS. 10 and 11, in the vicinity of the cut-section there is formed a section $A_1$ in which the boundary between the support 6 and the magnetic layer 7 located above the lower rotary blade 30 is sheared down to the rear surface side of the tape (downward in the drawings) in the vicinity of the cut-section, while in a section $B_1$ located under the upper rotary blade 20, on the contrary, there occur burrs where a portion 9 of the magnetic layer 7 is formed tapering away.

Detailed inspection of the burr shows that sometimes the top end of the burr is warped toward the magnetic tape surface. The burr is sheared away, for example, while the tape is guided by a tape edge limiting guide roller or the like acting as a tape guide in a tape carrier system, a magnetic tape cassette assembling apparatus, a recording/reproducing apparatus, or the like. There has thus been a problem in that sheared burr material contaminates the running system or peripheral equipment, or in a recording/reproducing apparatus the sheared burr material not only adheres to the tape running system or other parts of the apparatus, but also fouls the recording/reproducing head or causes data drop out.

On the other hand, generally in the slitting of metal products in a conventional "well shearing" processing, it is known that shearing can be carried out by setting the gap (distance in the direction perpendicular to the shearing section) between blade edges of upper and lower blades so as to cause cracks produced from the upper and lower directions to just come together. Generally in the case of a non-metal, it has been considered that well shearing can be performed by making this gap as small as possible. Since the burr height of the shearing section increases as the blade edge wears, the service life of the blade edge has been judged to end when this height is over a certain value.

It has been found, however, that when the above-mentioned rotary blades 20 and 30 are new or when their blade edges are renewed by grinding, the above-mentioned burr becomes more prominent in relation to the sharpness of the blades. That is, the applicants have found that the sharper the rotary blades 20 and 30, the more conspicuous the above-mentioned problem becomes.

In consideration of the above problems, methods of preventing the above-mentioned burrs from being formed have been disclosed, for instance, in Japanese Unexamined Patent Publications Nos. Sho. 62-86530 and Hei. 1-246094.

The magnetic recording medium disclosed in the former Publication is slit so that its magnetic layer is sheared down to the support side. However, for example, in the case of forming the edge of the thus-arranged tape as a slit section, rubbing of cutting devices (blade edges) such as rotary blades against each other becomes important because a comparatively large load is required on the cutting device. Thus, not only does such rubbing make the life of the cutting device short, but also the setting of the quantity of shearing is difficult.

In the latter Publication, there are proposed rotary blades for slitting a web of a photographic film, a magnetic tape, etc. These rotary blades have a feature that at least one of the blade edges of the upper and lower blades is chamfered so as to gradually part from the other blade radially outward.

It is said that the web slit by rotary blades having such a configuration as described above is rough in its slit section in the web thickness direction. However, the present applicants have found through detailed studies that although the above-mentioned roughness occurs to some extent, sometimes few such effects are produced, depending on the amount of chamfering. They also have found that the problem of burring in the magnetic layer cannot be solved only by forming the above-mentioned roughness.

A shearing theory, much like that applicable to metal shearing processes, can be applied to a web such as a magnetic tape. However, for practical mass production, it has been impossible to apply metal shearing theory without modification since a magnetic tape differs significantly from metal in material and other respects.

As the result of intensive studies, it has been found that the above-mentioned burr formation is produced by a mechanism as will now be described.

If the gap between the upper and lower blade side surfaces 28 and 39 of the upper and lower rotary blades 20 and 30 where they overlap is narrower than a certain range, cracking of the magnetic layer 7, which is the start point of shearing, is produced at the initial stage of shearing at a position closer to the lower blade side surface 39 (the left side in the drawing) from a line extending from the lower blade side surface 39. Therefore the magnetic layer section 9 on the slit section $B_1$ is made to project to the side (to the section $A_1$ side). Then, at the point where the upper and lower rotary blades 20 and 30 overlap each other radially in the shearing process, the magnetic layer section 9 is pressed against the lower blade side surface 39 and displaced on the lower blade side surface 39 while rubbing thereagainst (pressed downward in the drawing). As a result, the magnetic layer section 9 is bent up toward the reverse side opposite to the support 6, thus forming a burr.

Thus, by applying a shearing theory which is essentially the same as that for metal shearing processing in the above-mentioned manner, it has been impossible to surely suppress the generation of burrs.

SUMMARY OF THE INVENTION

It is therefore an object of the present invention to solve the foregoing problems, and thus to provide a method for slitting a magnetic tape whereby it is possible to surely prevent the formation of burrs along the edge of a magnetic tape, and thereby to eliminate contamination in a tape running system or peripheral equipment used in the process of producing a magnetic tape, or contamination in a tape running system or other parts in a recording/reproducing apparatus (which can cause head clogging, signal dropout, etc.

The foregoing object of the present invention can be attained by a method for slitting a magnetic tape, characterized in that when a continuously running magnetic tape having a magnetic layer formed on the surface of a non-magnetic substrate is slit from the top and bottom surfaces of the magnetic tape by a pair of upper and lower rotary blades having rotational axes substantially parallel to the tape surface and extending in the tape width direction and radially overlapping each other, the gap between circumferential surfaces of the rotary blades in the tape width direction is in a range of 3% to 20% of the thickness of the magnetic tape.

DESCRIPTION OF THE PREFERRED EMBODIMENTS

A preferred embodiment of a slitter to which the method for slitting a magnetic tape according to the present invention is applied will be described with reference to the accompanying drawings.

Figure 1:
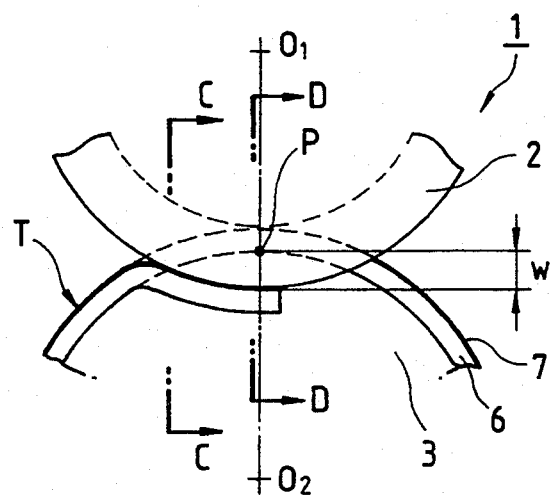
FIG. 1 is a schematic side view illustrating a slitter constructed in accordance with a preferred embodiment of the invention.
Figure 2:
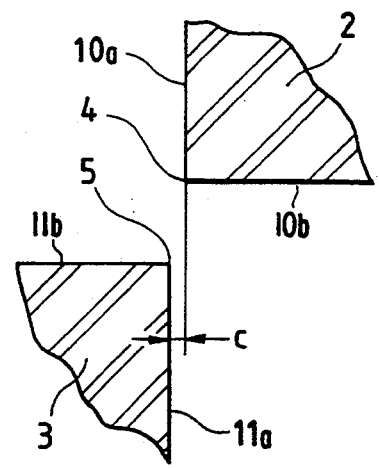
FIG. 2 is a partially sectional view illustrating cutting edge portions of the slitter.
Figure 3:
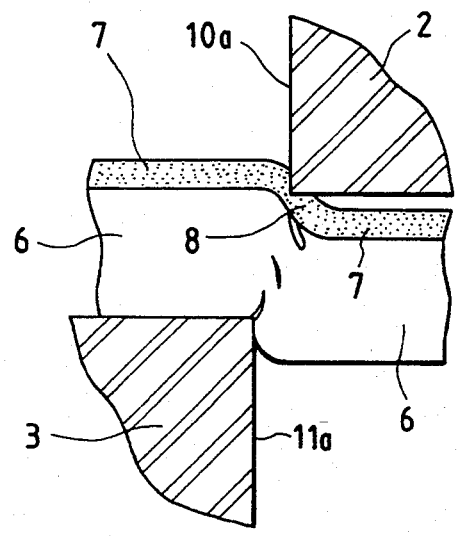
FIG. 3 is a sectional view taken along a line C—C in FIG. 1.
Figure 4:
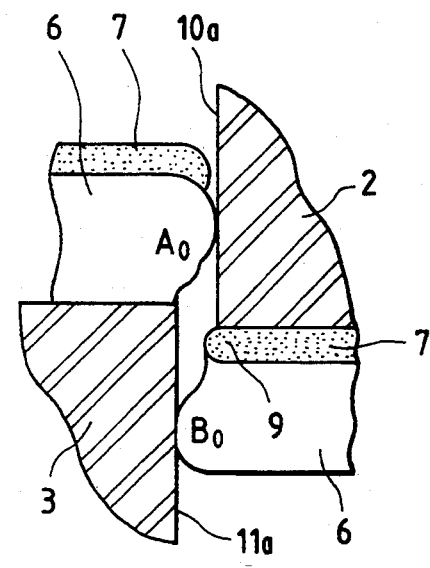
FIG. 4 is a sectional view taken along a line D—D in FIG. 1.

FIG. 1 is a schematic side view illustrating a slitter of this embodiment. FIG. 2 is a partially sectional view illustrating a cutting edge portions of the slitter. FIG. 3 is a sectional view taken along the line C—C in FIG. 1. FIG. 4 is a sectional view taken along the line D—D in FIG. 1.

A slitter 1 shown in FIG. 1 is constituted by a number of upper and lower blades 2 and 3, that is, rotary blades which are arranged in upper and lower pairs and which are arranged to rotate about rotational axes $O_1$ and $O_2$ arranged parallel to the tape surface of a comparatively wide magnetic tape T and extending in the width direction of the magnetic tape T. In each pair of blades, the upper blade 2 is located on the top side (the side on which a magnetic layer is formed) of the magnetic tape T, and the lower blade 3 is located on the bottom side of the tape.

The magnetic tape T may be composed of polyethylene terephthalate. The overall thickness t of the tape, including the magnetic layer, is in the range of 7 to 75 μm.

The upper and lower blades 2 and 3 are arranged so that their cutting edges 4 and 5 which are formed by the intersection of the side surface 10a, 11a and the circumferential surface 10b, 11b of each blade, radially overlap each other by a suitable amount w corresponding to the thickness of the magnetic tape T. The cutting edges 4 and 5 are right angular, and are located so as to have a predetermined gap C formed between their respective circumferential surfaces in the tape width direction (the direction of blade thickness).

As a result of studies carried out by the applicants upon the size of the above-mentioned gap C, surprisingly, it has been found that the gap has a particular relationship with the above-mentioned thickness t of the magnetic tape T (the overall thickness including the support 6 and magnetic layer 7). That is, if the gap C is not smaller than 3% of the thickness t of the magnetic tape T, it is possible to extremely effectively suppress generation of burrs.

Figure 10:
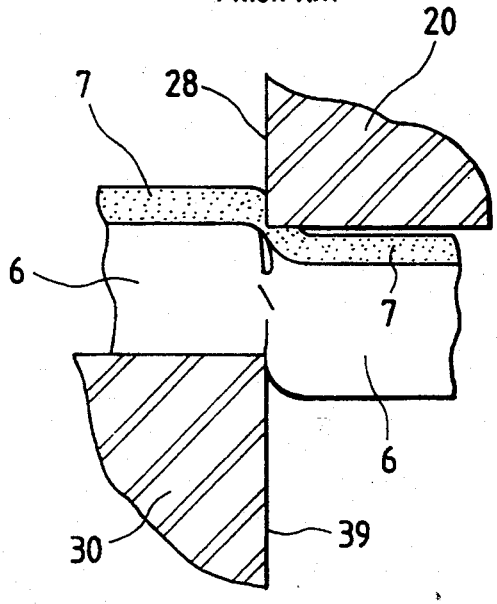
FIG. 10 is a sectional view taken along the line C—C in FIG. 9.
Figure 11:
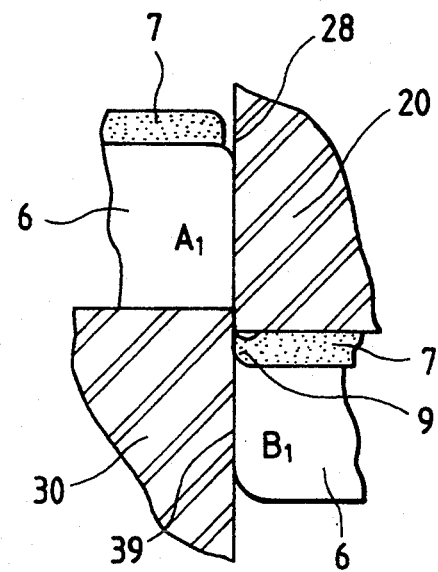
FIG. 11 is a sectional view taken along the line D—D in FIG. 9.

It has been found that if the gap C is less than 3% of the thickness of the magnetic tape T, cracks produced in the up/down direction of the tape come too close to the cutting edges which are opposite to each other. That is, the cutting position (see FIG. 10) of the magnetic layer 7 as a starting point in the upper side of the drawing in the process of shearing is located at a position closer to the lower blade side surface 39 (the left side in the drawing) than an extension line of the lower blade side surface 39. Consequently, the magnetic layer section 9 in the slit section $B_1$ is pressed and rubbed against the lower blade side surface 39, so that the magnetic layer section 9 is turned up on the side opposite to the support 6 so as to generate burrs.

On the other hand, if the gap C between the cutting edges 4 and 5 of the upper and lower blades 2 and 3 is set to a value not smaller than 3% of the thickness of the magnetic tape T, the starting point in the shearing process, for example, a cutting position 8 of the magnetic layer 7 pressed by the upper blade 2, occurs at a position closer to the upper blade side surface 10a (on the right side in FIG. 3) than the extension line of the lower blade side surface 11a. Therefore, the magnetic layer section 9 in the slit section $B_o$ is not pressed against the lower blade side surface 11a, even when the upper and lower blades 2 and 3 overlap each other radially in the shearing process, and needless to say, the section 9 is not displaced while being rubbed on the lower blade side surface 11a (pressed downward in the drawing) in the succeeding moving process. As a result, the magnetic layer section 9 is not turned up and does not generate burrs as in the conventional case. The slit section of the support 6, rather than the magnetic layer 7, projects in the sideward direction in the slit sections $A_o$ and $B_o$, which are end edges of the magnetic tape T, so that it is possible to prevent the magnetic layer 7 from contacting the guide of a tape running system, and it is possible to effectively prevent the magnetic layer from being torn off.

The gap C may not be increased without limitation. An upper limit should be established to prevent a large bending moment acting in the vicinity of the sheared portion so as to prevent the magnetic layer 7 from being strongly sheared down to thereby produce a large number of cracks in the surface of the magnetic layer 7. Since the generation of cracks becomes large with a width of the gap C of about 20% of the thickness of the magnetic tape T, the upper limit is about 20%.

The slitter for carrying out the method for slitting according to the present invention is not limited to the above-mentioned embodiment, and, for example, the structures shown in FIGS. 5 to 8 may be employed.

Figure 5:
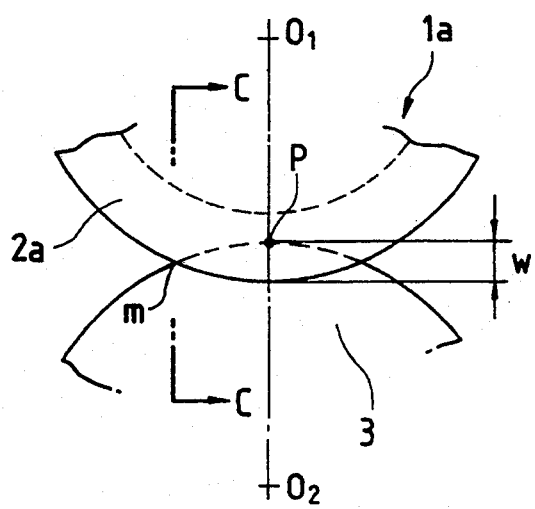
FIG. 5 is a schematic side view illustrating another slitter to which the present invention is applied.
Figure 6:
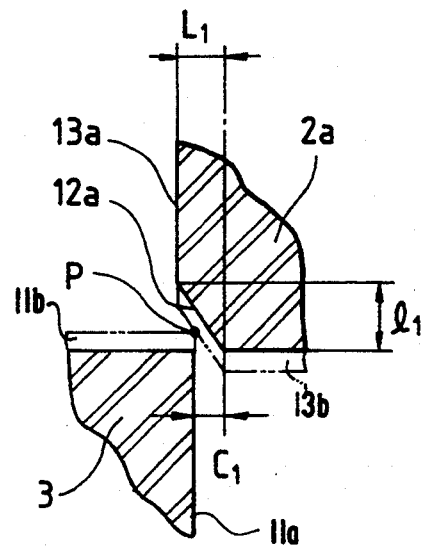
FIG. 6 is a sectional view taken along a line C—C illustrating cutting edge portions of the slitter shown in FIG. 5.

In the case shown in FIGS. 5 and 6, there is provided a slitter 1a having a structure wherein one of the cutting edges of one of the upper and lower blades 2a and 3 is replaced by a chamfered inclined side surface 12a which extends between the side surface 13a and the circumferential surface 13b of the one blade; (in the drawings, the upper blade 2a is chamfered). If the inclined side surface length of the inclined side surface 12a is larger than the amount of overlap W, the inclined side surface 12a of one blade 2a contacts the other blade 3 at a point P on the line connecting their respective rotational axes when the upper and lower blades 2a and 3 are pressed, but the cutting of the magnetic tape T is attained by a shearing force near a point m before the point P. Accordingly, a gap $C_1$ formed between the circumferential surfaces 13b, 11b of the upper and lower blades 2a and 3 produces the same effect as the above-mentioned gap C.

Figure 7:
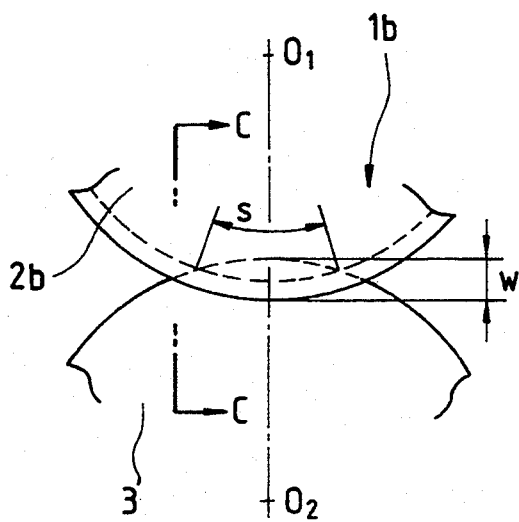
FIG. 7 is a schematic side view illustrating another slitter to which the present invention is applied.
Figure 8:
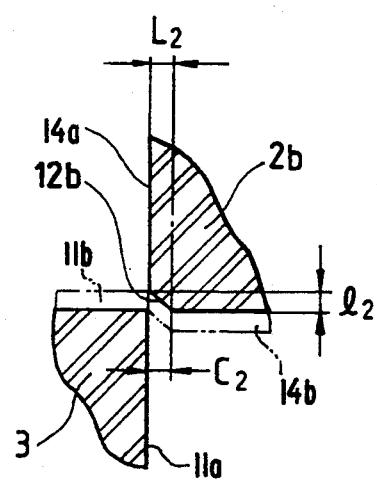
FIG. 8 is a sectional view taken along the line C—C illustrating cutting edge portions of the slitter shown in FIG. 7.
Figure 9:
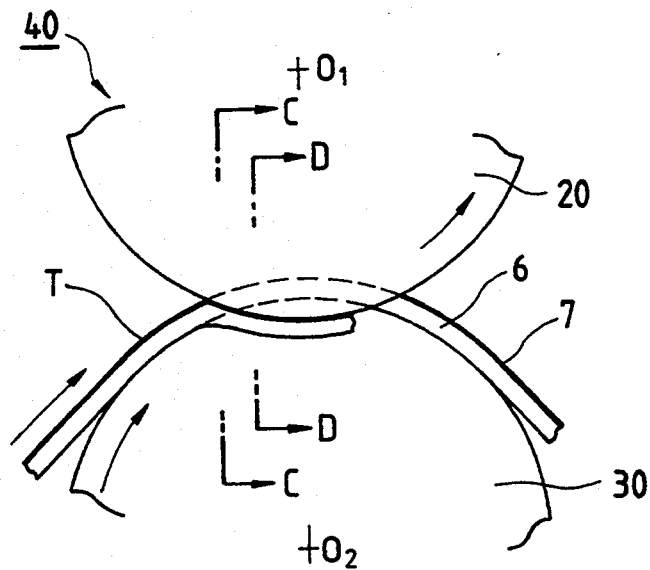
FIG. 9 is a schematic side view illustrating a conventional slitter.

In the case shown in FIGS. 7 and 8, there is provided a slitter 1b having a structure wherein one of the cutting edges of one of upper and lower blades 2b and 3 is replaced by a chamfered inclined side surface 12b which extends between the side surface 13a and the circumferential surface 13b of the one blade (in the drawings, the upper blade 2b is chamfered). If the inclined side surface length of the inclined side surface 12b is smaller than the overlap amount W, the side surface 12b of the one blade 2b contacts the other blade 3 at a point P on the line connecting their respective rotational axes in a contact area S when the upper and lower blades 2b and 3 are pressed, but the cutting of the magnetic tape T is attained by a shearing force in the area located before the contact area S. Thus, a gap $C_2$ between the circumferential surfaces 14b, 11b of the upper and lower blades 2b and 3 produces the same effects as the above-described gap C.

By setting the sizes of the respective inclined surfaces 12a and 12b so that the height components thereof $l_1$ and $l_2$ in the thickness direction of the tape were selected within a range of from ¼ times to 1000 times of the tape thickness t, and the width components of the same $L_1$ and $L_2$ in the thickness direction of the blades (i.e., width direction of the tape) were selected to be within a range of from 1/40 times to 18 times of the tape thickness, it was possible to perform extremely superior slitting.

As has been described, according to the present invention, a continuously running magnetic tape having a magnetic layer formed on the surface of a non-magnetic substance is slit from the top and bottom surfaces of the magnetic tape by a pair of upper and lower rotary blades having rotational axes substantially parallel to the tape surface and along the tape width direction and radially overlapping each other with a gap between circumferential surfaces of the rotary blades in the tape width direction set to be a value within the above-specified range. Accordingly, a crack start point in the initial time of the shearing process, for example, the position of a crack of the magnetic layer pressed by the upper blade, is surely produced at a position closer to the upper blade side surface than an extension line of the lower blade side surface of the lower blade opposite to the upper blade. Accordingly, there is no case where the magnetic layer edge at the cut section is pressed against the lower blade side surface to be thereby turned up. It is therefore possible to prevent the generation of burrs, which was unavoidable in the conventional case.

Moreover, with the present invention, adjustment of the apparatus can be carried out extremely easily, so that it is possible to improve both the quality and productivity of magnetic tapes.

In addition, according to the present invention, a support other than a magnetic layer projects sidewise in the above-mentioned cut sections which are end edges of the magnetic tape, so that it is possible to avoid contact of the magnetic layer with a guide of a tape running system, and it is therefore possible to effectively prevent the magnetic layer from being torn off. In addition, in the slitting method according to the present invention, the upper and lower rotary blades are prevented from rubbing each other. Accordingly, not only is the service life of the rotary blades long and hence the productivity high, but also with a magnetic tape produced by the method according to the present invention it is possible to prevent contamination of a running system or other parts, the generation of head clogging, signal drop-out, and the like in a recording/reproducing apparatus.

The effects of the present invention will be made clearer with reference to a specific example.

After components of the compositions shown in Table 1 were put into a ball mill and mixed and sufficiently dispersed, 30 parts by weight of epoxy resin (epoxy equivalent 500) was added thereto, mixed and dispersed uniformly, applied as a magnetic coating composition, and then dried so as to form a magnetic layer.

TABLE 1

| | |
|---|---|
| Powder of $\gamma$-Fe$_2$O$_3$ (needle particles of average particle size 0.5 $\mu$m in the length direction; coercive force 320 oersted) | 300 parts by weight |
| Vinylchloride-vinylacetate copolymer (copolymerization ratio 87:13, polymerization degree 400) | 30 parts by weight |
| Conductive carbon | 20 parts by weight |
| Polyamide resin (aminic equivalent 300) | 15 parts by weight |
| Lecithin | 6 parts by weight |
| Silicon oil (dimethyl polysiloxane) | 3 parts by weight |
| Xylol | 300 parts by weight |
| Methylisobutyl ketone | 300 parts by weight |
| n-butanol | 100 parts by weight |

The conditions of a support coated with a single layer of the above-mentioned coating composition were as follows:

Material: polyethylene terephthalate film
Thickness: 10 $\mu$m, 20 $\mu$m, 30 $\mu$m
Width: 300 mm
Tension: 4 kg/entire width of web
Slitting speed: 200 m/min
Film thickness (dried film thickness): 5 $\mu$m Accordingly, the overall thickness of the magnetic tape T was 15, 25 or 35 $\mu$m.

A slitter was provided having a basic configuration as shown in FIGS. 1, 2, 5 to 8. This slitter had 20 pairs of upper and lower blades. The diameters of the upper and lower blades were the same 150 mm, upper and lower edges 4 and 5 were right angular, the blade width of each upper blade 2 was about 1.5 mm and that of each lower blade 3 was about 12.65 mm, and the material of the blades was cemented carbide.

Under the above-described conditions, slitting was performed while changing the above-mentioned gap C between the circumferential surfaces. The gap C is expressed by a percentage relative to the overall thickness t, that is, 15, 25 or 35 $\mu$m, of the magnetic tape T.

The results of slitting are shown in Tables 2 to 4. In the Tables, the mark O indicates a superior cutting result in which little production of burrs is seen, the mark $\Delta$ indicates a cutting result in which the reproducibility was poor while a result a little superior to the conventional case might be obtained, and the mark X indicates a cutting result which is not preferred for practical use.

TABLE 2

| (Overall tape thickness: 15 $\mu$m) | | | |
|---|---|---|---|
| Gap C (%) | Valuation | Gap C (%) | Valuation |
| 0.0 | X | 10.0 | O |
| 1.0 | X | 13.0 | O |
| 1.5 | X | 15.0 | O |
| 2.0 | X | 18.0 | O |
| 2.5 | $\Delta$ | 19.0 | O |
| 3.0 | O | 20.0 | O |
| 3.5 | O | 21.0 | $\Delta$ |
| 4.0 | O | 22.0 | $\Delta$ |
| 4.5 | O | 25.0 | $\Delta$ |
| 5.0 | O | 27.0 | X |
| 7.0 | O | 30.0 | X |

TABLE 3

| (Overall tape thickness: 25 $\mu$m) | | | |
|---|---|---|---|
| Gap C (%) | Valuation | Gap C (%) | Valuation |
| 0.0 | X | 10.0 | O |
| 1.0 | X | 13.0 | O |
| 1.5 | X | 15.0 | O |
| 2.0 | $\Delta$ | 18.0 | O |
| 2.5 | $\Delta$ | 19.0 | O |
| 3.0 | O | 20.0 | O |
| 3.5 | O | 21.0 | $\Delta$ |
| 4.0 | O | 22.0 | $\Delta$ |
| 4.5 | O | 25.0 | X |
| 5.0 | O | 27.0 | X |
| 7.0 | O | 30.0 | X |

TABLE 4

| (Overall tape thickness: 35 $\mu$m) | | | |
|---|---|---|---|
| Gap C (%) | Valuation | Gap C (%) | Valuation |
| 0.0 | X | 10.0 | O |
| 1.0 | X | 13.0 | O |
| 1.5 | $\Delta$ | 15.0 | O |
| 2.0 | $\Delta$ | 18.0 | O |
| 2.5 | $\Delta$ | 19.0 | O |
| 3.0 | O | 20.0 | O |
| 3.5 | O | 21.0 | $\Delta$ |
| 4.0 | O | 22.0 | X |
| 4.5 | O | 25.0 | X |
| 5.0 | O | 27.0 | X |
| 7.0 | O | 30.0 | X |

As is apparent from the results shown in the above Tables, by setting the gap between the circumferential surfaces of the rotary blades at a value within the range of from 3% to 20% of the thickness of the magnetic tape, superior slitting could be performed.

What is claimed is:

1. In a method for slitting a magnetic tape in which a continuously running magnetic tape having a top and a bottom surface of a non-magnetic substance and having a magnetic layer formed on one of said surfaces is slit from said top and bottom surfaces of said magnetic tape by an upper and a lower rotary blade, wherein each of said blades has a rotational axis substantially parallel to each other and to said top and bottom surfaces and extending in a tape width direction, wherein an outer periphery of each of said blades radially overlap each other, and wherein one of the upper and lower blades has a right angular cutting edge formed in part by a circumferential surface and another one of the upper and lower blades has a chamfered cutting edge formed between a side surface and a circumferential surface, said chamfered cutting edge being formed by a chamfered inclined surface facing the other one of the blades having the right angular cutting edge, said method comprising the steps of forming a gap in an axial direction of said rotational axes between the circumferential surfaces of said rotary blades in said tape width direction, said gap having a width in a range of 3% to 20% of the thickness of said magnetic tape; and slitting the continuously running magnetic tape with said cutting edges of said upper and lower blades having said gap therebetween.

2. The method as defined in claim 1, wherein the total thickness of the magnetic tape is in a range of 7 to 75 $\mu$m.

3. The method as defined in claim 1, wherein said chamfered cutting edge is defined by a chamfering height, measured radially on said rotary blade, of said chamfered inclined surface of said chamfered cutting edge that is $\frac{1}{4}$ times to 1000 times as large as the tape thickness, and a chamfering width, measured axially on said rotary blade, of said chamfered inclined surface that is 1/40 times to 18 times as large as said tape thickness.

* * * * *